United States Patent
Terrien et al.

(10) Patent No.: US 11,291,946 B2
(45) Date of Patent: Apr. 5, 2022

(54) METHOD FOR DISTILLING A GAS STREAM CONTAINING OXYGEN

(71) Applicant: L'Air Liquide, Société Anonyme pour l'Etude et l'Exploitation des Procédés Georges Claude, Paris (FR)

(72) Inventors: Paul Terrien, Houston, TX (US); Nicolas Chantant, Grenoble (FR)

(73) Assignee: L'Air Liquide Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 16/954,777

(22) PCT Filed: Dec. 17, 2018

(86) PCT No.: PCT/FR2018/053339
§ 371 (c)(1),
(2) Date: Jun. 17, 2020

(87) PCT Pub. No.: WO2019/122661
PCT Pub. Date: Jun. 27, 2019

(65) Prior Publication Data
US 2021/0086129 A1 Mar. 25, 2021

(30) Foreign Application Priority Data
Dec. 21, 2017 (FR) ...................................... 1762860

(51) Int. Cl.
*F25J 3/02* (2006.01)
*B01D 53/047* (2006.01)
(Continued)

(52) U.S. Cl.
CPC ........... *B01D 53/047* (2013.01); *B01D 5/006* (2013.01); *B01D 5/0075* (2013.01);
(Continued)

(58) Field of Classification Search
None
See application file for complete search history.

(56) References Cited

U.S. PATENT DOCUMENTS

| 3,989,478 A | 11/1976 | Jones |
| 5,486,227 A | 1/1996 | Kumar et al. |

(Continued)

FOREIGN PATENT DOCUMENTS

| AU | 2017 270649 | 11/2017 |
| CA | 2 698 007 | 9/2011 |

(Continued)

OTHER PUBLICATIONS

International Search Report for corresponding PCT/FR2018/053339, dated Feb. 21, 2019.

(Continued)

*Primary Examiner* — Philip Y Louie
(74) *Attorney, Agent, or Firm* — Elwood L. Haynes

(57) ABSTRACT

A process for producing biomethane by scrubbing a biogas feed stream includes introducing the feed gas stream into a pretreatment unit wherein a $CO_2$-depleted gas stream is partially separated from a $CO_2$ stream and an oxygen stream and is compressed to a pressure P1 above 25 bar abs. Subjecting the $CO_2$-depleted gas stream to cryogenic separation in a distillation column to separate a nitrogen stream and produce a $CH_4$-enriched stream, the distillation column comprising n plates, n being an integer between 8 and 100. Recovering a pressurized $CH_4$-enriched stream by pumping the $CO_2$-depleted gas stream to a pressure P2 above 25 bar absolute.

6 Claims, 1 Drawing Sheet

(51) Int. Cl.
*B01D 5/00* (2006.01)
*B01D 53/22* (2006.01)
*B01D 53/26* (2006.01)

(52) U.S. Cl.
CPC ......... *B01D 53/225* (2013.01); *B01D 53/229* (2013.01); *B01D 53/261* (2013.01); *F25J 3/0209* (2013.01); *F25J 3/0233* (2013.01); *F25J 3/0257* (2013.01); *B01D 2257/102* (2013.01); *B01D 2257/104* (2013.01); *B01D 2257/504* (2013.01); *B01D 2257/80* (2013.01); *F25J 2200/02* (2013.01); *F25J 2210/42* (2013.01)

(56) References Cited

U.S. PATENT DOCUMENTS

| | | | |
|---|---|---|---|
| 5,669,958 | A | 9/1997 | Baker et al. |
| 5,964,923 | A | 10/1999 | Lokhandwala |
| 8,221,524 | B2 | 7/2012 | Mitariten |
| 2004/0103782 | A1 | 6/2004 | Wascheck et al. |
| 2010/0077796 | A1 | 4/2010 | Gadre et al. |
| 2010/0192627 | A1 | 8/2010 | Briend |
| 2013/0312457 | A1 | 11/2013 | Zick |
| 2019/0001263 | A1 | 1/2019 | Prince et al. |
| 2020/0318896 | A1 | 10/2020 | Prince et al. |

FOREIGN PATENT DOCUMENTS

| | | |
|---|---|---|
| EP | 0 772 665 | 12/1999 |
| EP | 1 979 446 | 3/2013 |
| FR | 2 917 489 | 12/2008 |
| FR | 2 971 332 | 8/2012 |
| WO | WO 2017 109305 | 6/2017 |
| WO | WO 2017 203112 | 11/2017 |

OTHER PUBLICATIONS

International Search Report for related PCT/FR2018/053338, dated Feb. 21, 2019.
International Search Report for related PCT/FR2018/053340, dated Feb. 21, 2019.

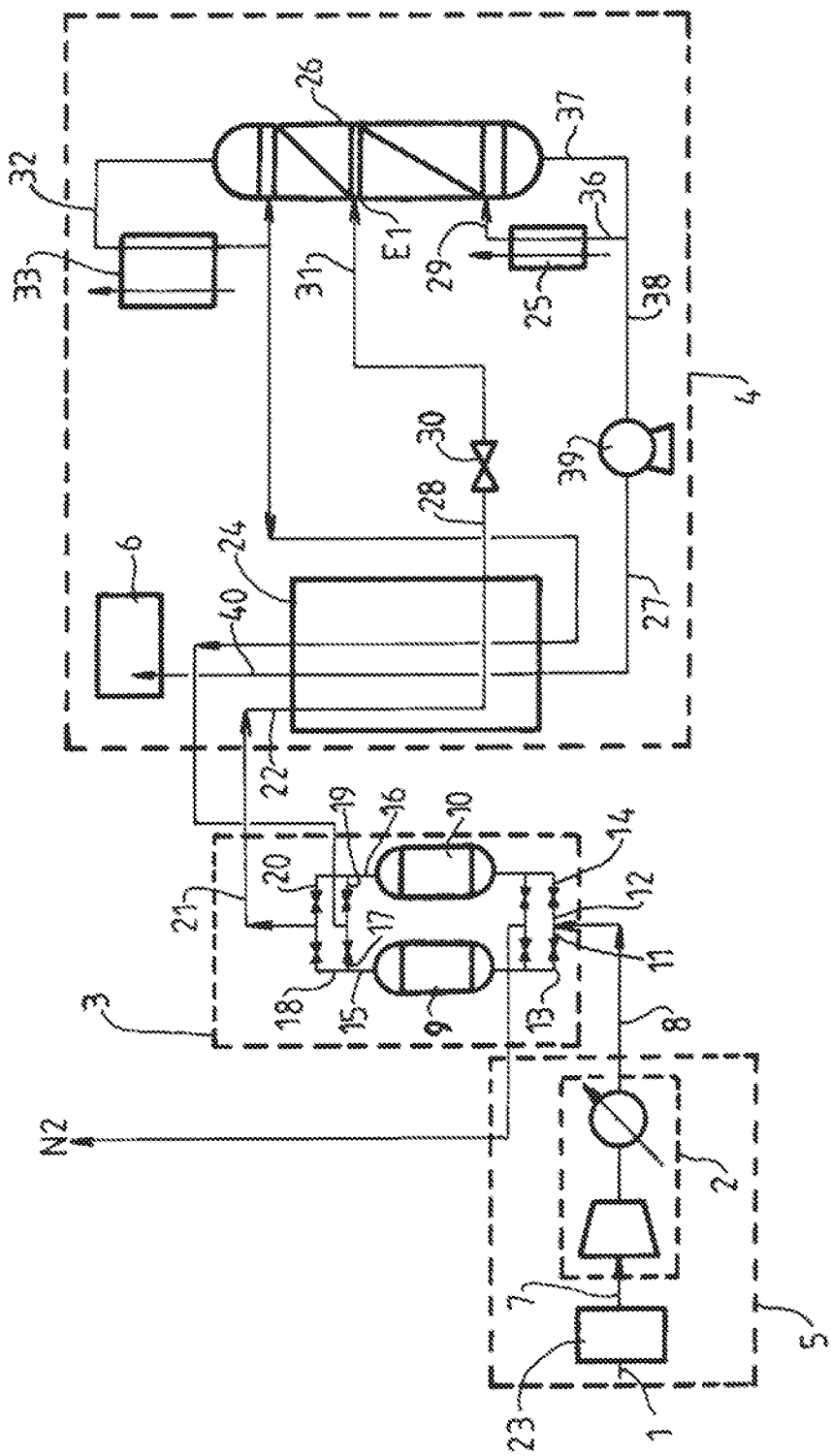

METHOD FOR DISTILLING A GAS STREAM CONTAINING OXYGEN

CROSS REFERENCE TO RELATED APPLICATIONS

This application is a 371 of International Application No. PCT/FR2018/053339, filed Dec. 17, 2018, which claims priority to French Patent Application No. 1762860, filed Dec. 21, 2017, the entire contents of which are incorporated herein by reference.

BACKGROUND

The invention relates to a process for producing biomethane by scrubbing biogas, for example biogas obtained from nonhazardous waste storage facilities (NHWSF). It also relates to a facility for implementing the process.

More precisely, the present invention relates to a process treatment by coupling membrane permeation and cryogenic distillation of a gas stream containing at least methane, carbon dioxide, atmospheric gases (nitrogen and oxygen) and pollutants ($H_2S$ and volatile organic compounds (VOC)). The object is to produce a methane-rich gas stream whose methane content is compliant with the requirements for its use and to minimize the impact of the discharges of $CH_4$ into the atmosphere (gas with a strong greenhouse effect).

The invention relates in particular to the scrubbing of biogas obtained from nonhazardous waste storage facilities (NHWSF), for the purpose of producing biomethane that is compliant with injection into a natural gas network or in local use as a vehicle fuel.

Anaerobic digestion of the organic waste present in NHWSFs produces a large amount of biogas throughout the period of exploitation of the NHWSF and even several years after discontinuing the exploitation of and closing down the NHWSF. Because of its main constituents—methane and carbon dioxide—biogas is a powerful greenhouse gas; at the same time, it also in parallel constitutes a source of renewable energy that is appreciable in the context of the increasing scarcity of fossil fuels.

Biogas contains several pollutant compounds and it must be scrubbed to enable commercial exploitation. Several processes exist for performing the recovery and scrubbing of biogas.

Biogas predominantly contains methane ($CH_4$) and carbon dioxide ($CO_2$) in variable proportions as a function of the production method.

In the case of biogas from NHWSFs, the gas also contains a proportion of atmospheric gases (nitrogen and oxygen) and also, in a smaller proportion, water, hydrogen sulfide and volatile organic compounds (VOCs). Depending on the organic matter degraded, the techniques used and the particular conditions (climate, typology, etc.) of each NHWSF, the proportions of the components of biogas differ. However, on average, biogas includes, on a dry gas basis, from 30% to 60% of methane, from 15% to 50% of $CO_2$, from 0 to 30% of nitrogen, from 0 to 6% of oxygen, from 0 to 1% of $H_2S$ and from a few tens of milligrams to a few thousand milligrams per normal cubic meter of VOCs and a certain number of other impurities in trace amount.

Biogas is profitably exploited in various ways. It may, after a partial treatment, be profitably exploited close to the production site to provide heat, electricity or the two combined (cogeneration). The large content of carbon dioxide and nitrogen reduces its calorific power, increases the compression and transportation costs and limits the economic interest of its profitable exploitation to this nearby use.

More rigourous scrubbing of biogas allows it to be put to broader use. In particular, rigourous scrubbing of biogas makes it possible to obtain a scrubbed biogas which meets the specifications for natural gas and which can substitute for same, Biogas thus scrubbed is known as "biomethane". Biomethane thus supplements the natural gas resources with a renewable portion produced at the heart of territories. It may be used for exactly the same purposes as natural gas of fossil origin. It can supply a natural gas network, or a vehicle filling station.

The ways in which biomethane is profitably exploited are determined according to the local context: local energy requirements, possibilities for profitably exploiting it as a biomethane fuel, existence of natural gas transport or distribution networks nearby, notably. By creating synergy between the various parties operating in a given territory (farmers, manufacturers, civic authorities), the production of biomethane aids the territories in acquiring greater energy autonomy.

It should be noted that, depending on the country, the environmental regulations often impose constraints regarding discharging into the atmosphere.

In point of fact, it is necessary to install technologies for limiting the impacts of the greenhouse gases ($CH_4$) and of the pollutants ($H_2S$ and VOC) contained in biogas. It is thus important to have a high $CH_4$ yield (equal, in mass, to the amount of $CH_4$ profitably exploited relative to the amount of $CH_4$ contained in the biogas) and to provide treatment systems for $H_2S$ and VOCs which avoid atmospheric discharging.

Moreover, an additional problem remains the presence of $O_2$, which, during the separation of the mixture, may generate an explosive atmosphere during the various enrichment steps. This risk of creating an explosive mixture makes refuse-site biogas particularly difficult to scrub in a safe and economic manner.

U.S. Pat. No. 8,221,524 B2 describes a process for $CH_4$ enrichment of a gas, to a proportion of 88%, via various recycling steps. The process consists in compressing the gas stream and then in passing it over an adsorbent to remove the VOCs. The gas stream is then subjected to a step of membrane separation and then to a step of pressure-swing adsorption (PSA). The adsorbent used in PSA is of the CMS (carbon molecular sieve) type and makes it possible to remove the nitrogen and a small portion of the oxygen.

EP1979446 describes a biogas scrubbing process which consists in removing the $H_2S$, in compressing the gas and in filtering it to remove the particles. The gas is then subjected to a membrane separation step to remove the $CO_2$ and $O_2$, drying by passing through PSA and then through various filters and finally through PSA once again to remove the nitrogen. The gas is finally liquefied.

US 2004/0103782 describes a biogas scrubbing process which consists in removing in compressing the gas, filtering it to remove the particles, subjecting it to a pressure-swing adsorption (PSA) step to remove the VOCs, and then to membrane separation to remove the majority of the $CO_2$ and also a fraction of the oxygen.

U.S. Pat. No. 5,486,227 describes a process for scrubbing and liquefying a gas mixture, which consists in subjecting the stream to temperature-swing adsorption (TSA) to remove the $H_2S$ notably, and then to pressure-swing adsorption (PSA) to remove the $CO_2$ notably, and finally to cryogenic separation to remove the nitrogen and to retain only the methane.

U.S. Pat. Nos. 5,964,923 and 5,669,958 describe a process for treating a gaseous effluent, which consists in dehydrating the gas, condensing it by passing it through an exchanger, and subjecting the gas to membrane separation, and then to cryogenic separation.

US 2010/077796 describes a scrubbing process which consists in subjecting the gas stream to membrane separation, treating the permeate in a distillation column, and then mixing the methane gas originating from the column, after vaporization, with the retentate obtained on conclusion of the membrane separation.

U.S. Pat. No. 3,989,478 and FR 2917489 describe cryogenic systems for scrubbing a methane-rich stream. These two systems use an adsorption system to scrub out the $CO_2$ before the liquefaction step.

In U.S. Pat. No. 3,989,478, the regeneration of the adsorption systems is performed by means of the nitrogen-rich distillate recovered at the top of the distillation column. In FR 2917489, the regeneration of the adsorption systems is performed by means of the liquid methane withdrawn at the bottom of the distillation column.

EP 0772665 describes the use of a cryogenic distillation column for the separation of colliery gas composed mainly of $CH_4$, $CO_2$ and nitrogen.

None of the cited documents makes it possible to solve the problem of providing biomethane without the risk associated with $O_2$, with a methane concentration of greater than 95%, a $CO_2$ concentration of less than 2.5% and with a methane yield of greater than 85%.

One of the problems which the invention thus addresses is that of providing a biogas scrubbing process which complies with the above constraints, i.e. a process that is safe, with an optimum yield, producing a high-quality biomethane which can substitute for natural gas and which complies with the environmental standards notably as regards the destruction of pollutant compounds such as VOCs and compounds with a powerful greenhouse effect such as $CH_4$. The gas thus produced will be able to be profitably exploited in gaseous form either by injection into a gas network or else for mobility applications.

Moreover, in the prior art, it is known practice to treat biogas in a gas scrubbing unit which may use the following steps: a PSA (pressure-swing adsorption), an adsorbent sieve (to remove the VOCs) and a membrane stage.

The $CO_2$ is predominantly removed on the membrane step. This imperfect separation leaves in the "scrubbed" gas a $CO_2$ content that is often between 0.5 mol % and 1.5 mol %. It is possible to reduce the $CO_2$ content in the scrubbed gas by over-dimensioning the separation unit (entailing greater consumption of the compressor). In any case, the $CO_2$ content in the scrubbed gas will never be able to be very much less (same order of magnitude of concentration).

This scrubbed gas containing, inter alia, the remainder of the $CO_2$, methane, a small amount of oxygen and nitrogen (between 1 mol % and 20 mol %) is then treated in a cryogenic unit.

The temperatures reached in this unit are of the order of −100° C. or even lower, which, at low pressure (between atmospheric pressure and about 30 bar) brings about solidification of the $CO_2$ contained in the gas to be treated.

One solution frequently employed is to use a scrubbing step based on the adsorption technology (TSA, temperature-swing adsorption). This technology makes it possible to achieve very low $CO_2$ contents (for example 50 ppmv in the case of a liquefied natural gas). At these contents, the $CO_2$ does not solidify at the temperatures under consideration, even at low pressure, since it is still soluble in the methane.

However, this scrubbing unit is relatively expensive and requires the use of a "regeneration" gas in order to be able to evacuate the arrested $CO_2$. The gas frequently used is either the nitrogen that has been separated out in the cryogenic step, or the methane produced at the NRU (Nitrogen rejection unit) outlet. If nitrogen is used, It is possible that it is necessary to degrade the yield of the unit or to add nitrogen in order to manage to obtain the required flow rate. If the production methane is used, peaks of $CO_2$ concentration associated with the desorption may appear, rendering the gas noncompliant with the specifications.

Moreover, the gas obtained from a refuse site or from a biogas production unit contains oxygen (typical value between 0% and 1 mol % of oxygen, but potentially more).

This oxygen is partially removed in the pretreatment steps, notably the membrane step which consists in removing the $CO_2$. During this step, the amount of oxygen as an absolute value decreases, but its concentration increases or remains constant.

The oxygen entering the cryogenic part runs the risk of becoming concentrated in certain places such as the distillation column. Specifically, the volatility of oxygen is between that of nitrogen and that of methane. It is thus entirely possible to create zones of oxygen concentration in the distillation column. If it is not controlled, this concentration may reach values that are liable to bring about ignition or even explosion of the gas mixture. This is a safety risk of major importance that the inventors of the present invention have sought to minimize.

There is thus a need to improve the processes as described above while at the same time reducing the operating costs.

The inventors of the present invention thus developed a solution for solving the problems raised above.

SUMMARY

One subject of the present invention is a process for producing biomethane by scrubbing a biogas feed stream, comprising the following steps:

Step a): introducing a feed gas stream into a pretreatment unit in which said gas stream is partially separated from the $CO_2$ and the oxygen it contains and is compressed to a pressure P1 above 25 bar abs, but preferably above 50 bar abs;

Step b): introducing the $CO_2$-depleted gas stream obtained from step b) to cryogenic separation in a distillation column to separate the nitrogen from said gas stream, said distillation column comprising n plates, n being an integer between 8 and 100;

Step c): recovering a $CH_4$-enriched stream obtained from the cryogenic separation by pumping the product from the vessel of said column at a pressure P2 above 25 bar abs but preferably above the critical pressure of said product, characterized in that the $CO_2$-depleted gas stream obtained from step a) and used in step b) has an oxygen concentration equal to C1 and in that:

when C1 is strictly greater than 1 mol %, the process is stopped; and when C1 is strictly greater than 0.1 mol %, the $CO_2$-depleted gas stream obtained from step a) and used in step b) is introduced into the distillation column at a level between plate n-4 and plate n, plate n being the plate that is positioned the highest in said column.

The distillation columns have a cylindrical shape, and their height is always very great compared to their diameter. The ones most commonly used are equipped with plates.

The purpose of the plates of a column is to place the liquid, which redescends by gravity, in contact with the ascending vapor. They include an active area pierced with holes, optionally equipped with flap valves or bells, a dam for retaining a certain thickness of liquid on the plate, and a spout for bringing the liquid of the plate under consideration to the lower plate.

The solution that is the subject of the present invention is thus that of not further reducing the $CO_2$ content at the outlet of the membrane step, while at the same time ensuring a sufficient solubility of the $CO_2$ in the gas to be treated (mainly methane) so as to avoid crystallization, at any point in the process.

The TSA step for predominantly scrubbing the $CO_2$ is thus eliminated. The gas which feeds the cryogenic section thus contains between 0.3 mol % and 2 mol % of $CO_2$.

Moreover, the solution that is the subject of the present invention makes it possible to limit the accumulation of oxygen during the distillation.

According to other embodiments, a subject of the invention is also:

A process as defined previously, characterized in that when C1 is strictly greater than 0.5 mol % and less than or equal to 1 mol %, the $CO_2$-depleted gas stream obtained from step a) and used in step b) is introduced into the distillation column at the level of plate n, plate n being the plate that is positioned the highest in said column.

A process as defined previously, characterized in that n is between 15 and 100 and in that when C1 is less than or equal to 0.1 mol %, the $CO_2$-depleted gas stream obtained from step a) and used in step b) is introduced into the distillation column at a level between plate n-10 and plate n-5, plate n being the plate that is positioned the highest in said column.

A process as defined previously, characterized in that step a) also comprises a step of scrubbing the water from the gas stream compressed to the pressure P1.

A process as defined previously, characterized in that said $CO_2$-depleted gas stream obtained from step a) and used in step b) comprises between 0.3 mol % and 2 mol % of $CO_2$.

A process as defined previously, characterized in that, during step a), the separation of the $CO_2$ and of the oxygen from the feed gas stream is performed by a unit comprising at least two separating membrane stages.

A process as defined previously, characterized in that the pressure P2 of step c) is greater than 40 bar abs.

A process as defined previously, characterized in that, during step b), the $CO_2$-depleted gas stream obtained from step a) undergoes an expansion to a pressure P3 of between 15 bar abs and 40 bar abs prior to being introduced into said distillation column. Preferably, P3 is greater than 25 bar absolute.

A process as defined previously, characterized in that prior to the expansion, the $CO_2$-depleted gas stream obtained from step a) is at least partially condensed in a heat exchanger.

A process as defined previously, characterized in that the $CO_2$-depleted gas stream obtained from step a) is at least partially condensed in a heat exchanger countercurrentwise relative to the $CH_4$-enriched stream obtained from step c) and to at least part of the nitrogen stream separated out during step b).

A subject of the invention is also:

A facility for producing biomethane by scrubbing biogas obtained from nonhazardous waste storage facilities (NHWSF) using the process as defined previously.

A facility as defined above for producing biomethane by scrubbing biogas obtained from nonhazardous waste storage facilities (NHWSF) as defined previously, successively comprising:
  a source of biogas;
  a pretreatment unit for removing all or some of the VOCs, the water and the sulfur compounds from the gas stream to be treated;
  at least two separating membrane stages that are capable of partially separating the $CO_2$ and $O_2$ from said gas stream;
  a compressor that is capable of compressing said gas stream to a pressure of between 25 and 100 bar;
  a heat exchanger that is capable of cooling the $CO_2$-depleted gas stream;
  a distillation column;
  characterized in that the distillation column comprises n plates and in that the level of introduction of the stream to be treated into said column depends on the oxygen concentration of said stream to be treated, n being an integer between 8 and 100.

The heat exchanger may be any heat exchanger, any unit or other arrangement suitable for allowing the passage of a certain number of streams, and thus allowing direct or indirect heat exchange between one or more coolant fluid lines and one or more feed streams.

Limiting the number of real plates above the injection into the distillation column of the gas to be treated (maximum of 4 real plates) when C1 is greater than 0.1 mol % makes it possible to limit the creation of an oxygen loop in the column.

The gas to be treated is thus cooled partially or totally liquefied in the exchange line. It is then expanded to the distillation pressure. The partially or totally liquefied gas is expanded and then injected into the distillation column. This injection is performed either directly at the top at the level of one of the four top plates of the column.

BRIEF DESCRIPTION OF THE DRAWING

For a further understanding of the nature and objects for the present invention, reference should be made to the following detailed description, taken in conjunction with the accompanying drawings, in which like elements are given the same or analogous reference numbers and wherein:

FIG. 1 illustrates a particular embodiment of a process according to the invention performed by a facility as represented schematically in the FIGURE.

The same reference denotes a liquid stream and the pipe which conveys it, the pressures under consideration are absolute pressures and the percentages under consideration are molar percentages.

DETAILED DESCRIPTION OF PREFERRED EMBODIMENTS

In FIG. 1, the facility comprises a source of biogas (1) to be treated, a pretreatment unit (5) comprising a compression unit (2) and a $CO_2$ and $O_2$ scrubbing unit (23), a VOC and water scrubbing unit (3), a cryodistillation unit (4), and finally a methane gas recovery unit (6). All the items of equipment are connected together via pipes.

Upstream of the compression unit (2) is the $CO_2$ scrubbing unit (23) and optional prior pretreatment units.

The CO$_2$ scrubbing unit (23) combines, for example, two membrane separation stages. The membranes are chosen to allow the separation of at least 90% of the CO$_2$ and about 50% of the O$_2$. The retentate obtained from the first separation is then directed toward the second membrane separation. The permeate obtained from the second membrane separation is recycled by means of a pipe connected to the main circuit upstream of the compressor. This step makes it possible to produce a gas (7) with less than 3% of CO$_2$ and with a CH$_4$ yield of greater than 90%. The temperature of this stream is typically ambient; if necessary, steps of cooling with air or with water may be incorporated.

The compression unit (2) is, for example, in the form of a piston compressor.

This compressor compresses the gas stream (7) to a pressure of between, for example, 50 and 80 bar. The stream exiting is denoted in FIG. 1 by the reference (8).

The (TSA) unit (3) for scrubbing VOC and water comprises two bottles (9, 10), They are filled with adsorbents chosen specifically to allow the adsorption of water and of VOCs, and their subsequent desorption during regeneration. The bottles function alternately in production mode and in regeneration mode.

In production mode, the bottles (9, 10) are fed with gas stream at their lower part. The pipe in which the gas stream (8) circulates splits into two pipes (11, 12), each equipped with a valve (13, 14) and feeding the lower part, respectively, of the first bottle (9) and of the second bottle (10). The valves (13, 14) will be alternately closed as a function of the saturation level of the bottles. In practice, when the first bottle is saturated with water, the valve (13) is closed and the valve (14) is opened to begin filling the second bottle (10). A pipe (15 and 16), respectively, emerges from the upper part of each of the bottles. Each of them is split into two pipes (17, 18) and (19, 20), respectively. The stream scrubbed of water and of VOC originating from the first bottle circulates in the pipe (18), whereas the stream scrubbed of water and of VOC originating from the second PSA circulates in the pipe (20). The two pipes are joined to form a single line (21) feeding the cryogenic unit (4).

In regeneration mode, the regeneration gas circulates in the pipes (17, 19). It emerges at the lower part of the bottles.

The cryodistillation unit (4) is fed via the pipe (21) in which circulates the gas stream (22) to be scrubbed. It contains three elements, a heat exchanger (24), a reboiler (25) and a distillation column (26), respectively.

The exchanger (24) is preferably an aluminum or stainless steel brazed plate exchanger. It cools the gas stream (22) circulating in the line (21) by heat exchange with the liquid methane stream (27) withdrawn from the distillation column (26). The gas stream (22) is cooled (28) to a temperature of about −100° C. The two-phase stream (28) resulting therefrom may alternatively ensure the reboiling of the reboiler of the vessel (25) of the column (26) and the heat (29) produced is transferred to the vessel of the column (26).

The cooled fluid (28) is expanded by means of a valve (30) to a pressure, for example, of between 20 bar absolute and 45 bar absolute. The fluid, which is then in two-phase form or in liquid form (31), is introduced into the column (26) at a stage E1 located in the upper part of said column (26) at a temperature, for example, of between −110° C. and −100° C.

The CO$_2$-depleted gas stream (22) introduced into the column (26) at a stage E1 has an oxygen concentration equal to C1.

When C1 is strictly greater than 1 mol %, the process is stopped.

When C1 is strictly greater than 0.1 mol %, the gas stream (22) is introduced into the distillation column at a level E1 between plate n-4 and plate n, plate n being the plate that is positioned the highest in said column. When C1 is strictly greater than 0.5 mol % and less than or equal to 1 mol %, the gas stream (22) is introduced into the distillation column at a level E1 of plate n, plate n being the plate that is positioned the highest in said column.

The liquid (31) is then separated in the column (26) to form a gas (32) by means of the condenser (33). Cooling of the condenser (33) may be performed, for example, by means of a refrigerating cycle using nitrogen and/or methane. A portion (36) of the liquid (37) leaving the vessel of the distillation column (26), at a temperature of between −120° C. and −90° C., is sent to the reboiler (25) where it is partially vaporized. The gas formed (29) is sent to the vessel of the column (26). The other portion (38) of the remaining liquid (37) is pumped by means of a pump (39) to form the liquid methane stream (27) which is vaporized in the exchanger (24) to form a pure methane gas product (40).

This pumping step is performed at a high pressure, typically above the critical pressure and above 40 bar absolute, preferentially above 50 bar absolute. This pressure level makes it possible to avoid the accumulation of CO$_2$ in the last drop to be vaporized of the exchange line. Since the gas is very low in heavy hydrocarbons, the dew point of the gas below the critical pressure is very low (typically below −90° C.).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for producing biomethane by scrubbing a biogas feed stream, the process comprising:
    introducing the feed gas stream into a pretreatment unit wherein a CO$_2$-depleted gas stream is partially separated from a CO$_2$ stream and an oxygen stream and is compressed to a pressure P1 above 25 bar absolute;
    subjecting the CO$_2$-depleted gas stream to cryogenic separation in a distillation column to separate a nitrogen stream and produce a CH$_4$-enriched stream, the distillation column comprising n plates, n being an integer between 8 and 100;
    recovering a pressurized CH$_4$-enriched stream by pumping the CH$_4$-enriched stream to a pressure P2 above 25 bar absolute,
    wherein the CO$_2$-depleted gas stream has an oxygen concentration equal to C1 and wherein:
    when C1 is strictly greater than 1 mol %, the process is stopped; and
    when C1 is strictly greater than 0.1 mol % and less than 1 mol %, the CO$_2$-depleted gas stream is introduced into the distillation column at a level between plate n-4 and plate n, plate n being the plate that is positioned the highest in said column.

2. The process of claim 1, wherein n is between 15 and 100 and wherein when C1 is less than or equal to 0.1 mol %, the CO$_2$-depleted gas stream is introduced into the distillation column at a level between plate n-10 and plate n-5, plate n being the plate that is positioned the highest in said column.

3. The process of claim 1, wherein P1 is greater than 50 bar absolute.

4. The process of claim 1, wherein the pressure P2 is greater than 40 bar absolute.

5. The process of claim 1, wherein, during step b), the $CO_2$-depleted gas stream undergoes an expansion to a pressure P3 of between 15 bar absolute and 40 bar absolute prior to being introduced into said distillation column.

6. The process of claim 1, wherein the $CO_2$-depleted gas stream is at least partially condensed in a heat exchanger counter-currentwise relative to the $CH_4$-enriched stream and to at least part of the nitrogen stream.

* * * * *